J. A. ST. JOHN.
OPENWORK STABLE FLOOR.
APPLICATION FILED JUNE 22, 1916.

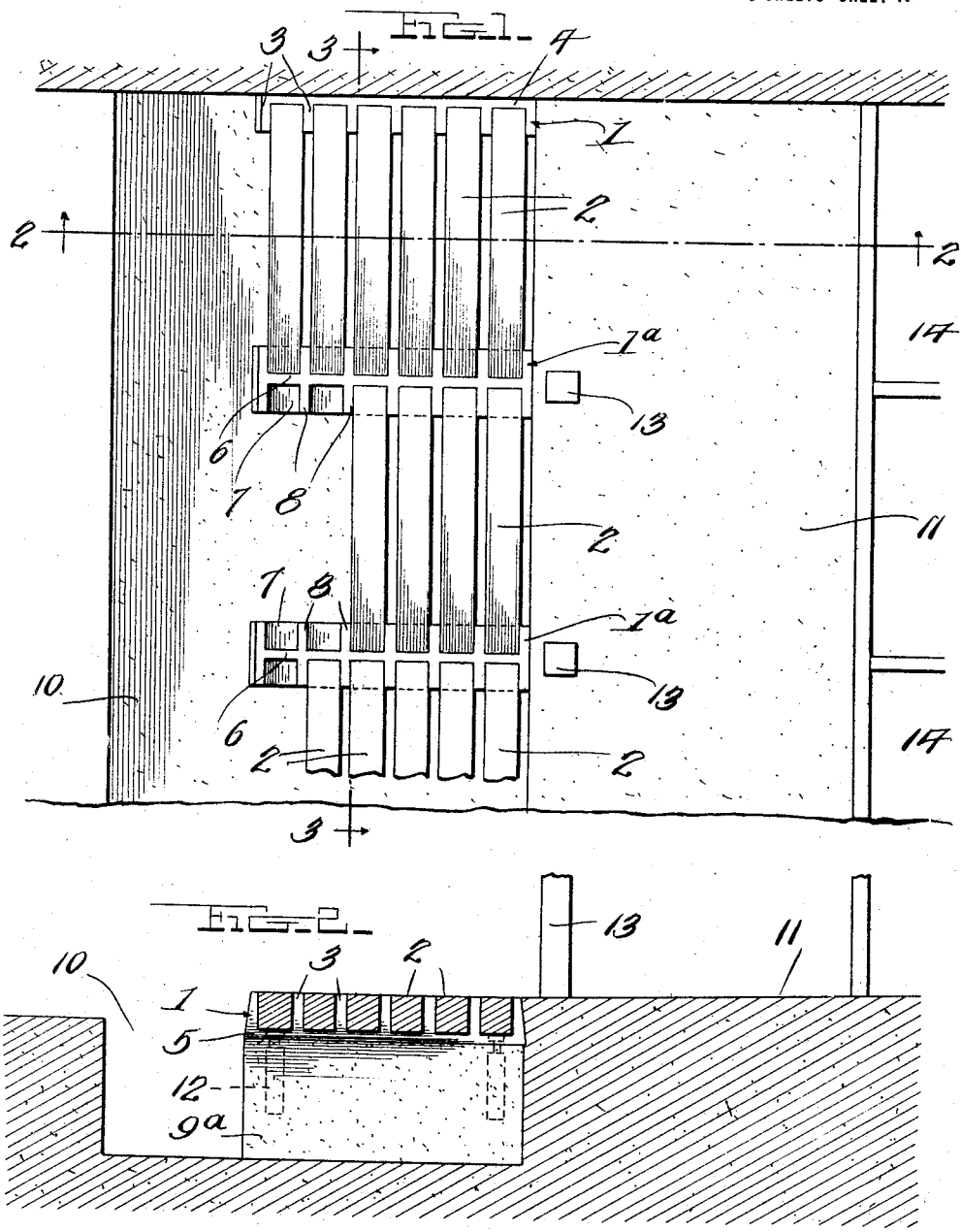

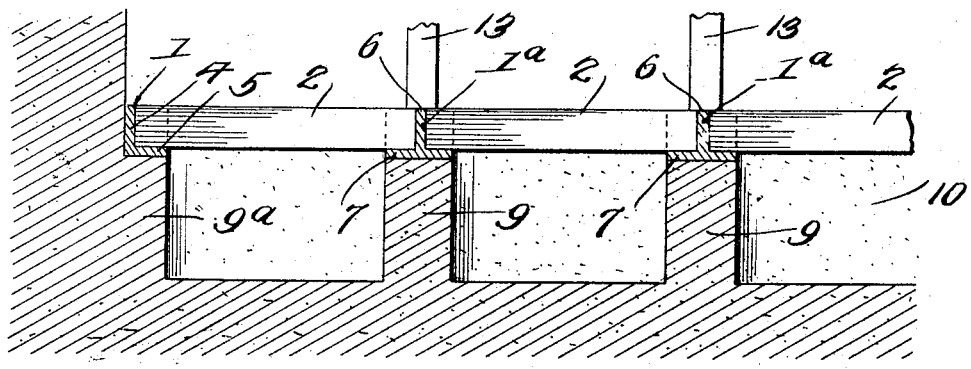
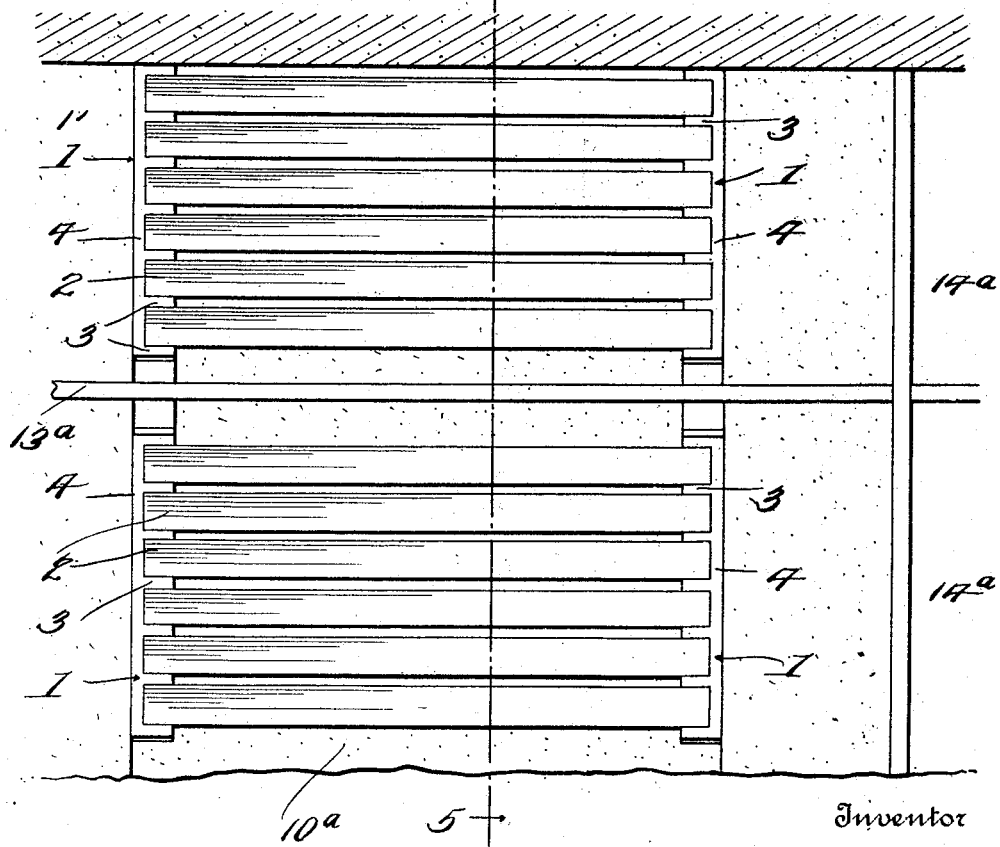

1,259,802.

Patented Mar. 19, 1918.
3 SHEETS—SHEET 3.

Witness
J. R. Pierce

Inventor
J. A. St. John
By H. B. Willson & Co.
Attorneys

UNITED STATES PATENT OFFICE.

JAMES A. ST. JOHN, OF NILES, OHIO.

OPENWORK STABLE-FLOOR.

1,259,802.      Specification of Letters Patent.      Patented Mar. 19, 1918.

Application filed June 22, 1916. Serial No. 105,265.

*To all whom it may concern:*

Be it known that I, JAMES A. ST. JOHN, a citizen of the United States, residing at Niles, in the county of Trumbull and State of Ohio, have invented certain new and useful Improvements in Openwork Stable-Floors; and I do declare the following to be a full, clear, and exact description of the invention, such as will enable others skilled in the art to which it appertains to make and use the same.

My invention relates to improvements in openwork floors for cow and horse stalls, the object being to provide a simply constructed and inexpensive arrangement which may well be installed by practically any farmer, the device being so designed as to permit all moisture to drain from the stalls.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a top plan view of a plurality of cow stalls constructed in accordance with my invention, showing the manner in which the floors of the stalls may be easily lengthened or shortened to render them suitable for cows of different lengths;

Fig. 2 is a longitudinal section of one stall on the plane indicated by the line 2—2 of Fig. 1;

Fig. 3 is a vertical transverse section on the plane of the line 3—3 of Fig. 1;

Fig. 4 is a plan view showing the manner in which the improved floor is applied to horse stalls;

Figure 5:
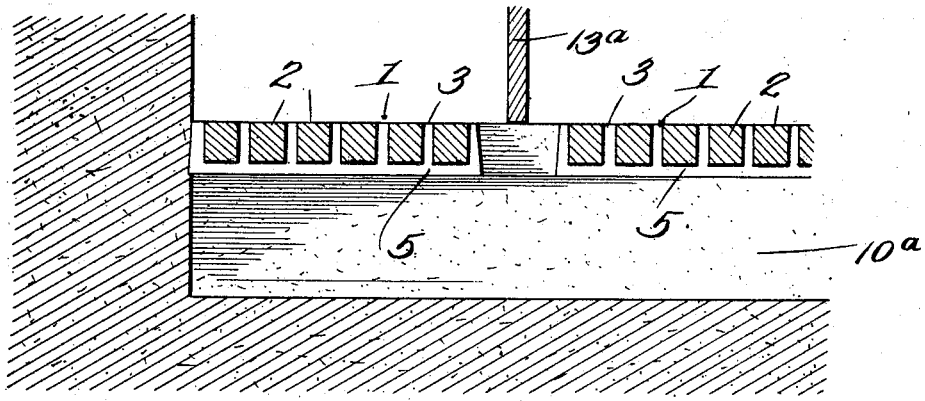
Fig. 5 is a transverse section on the plane of the line 5—5 of Fig. 4.
Figure 6:
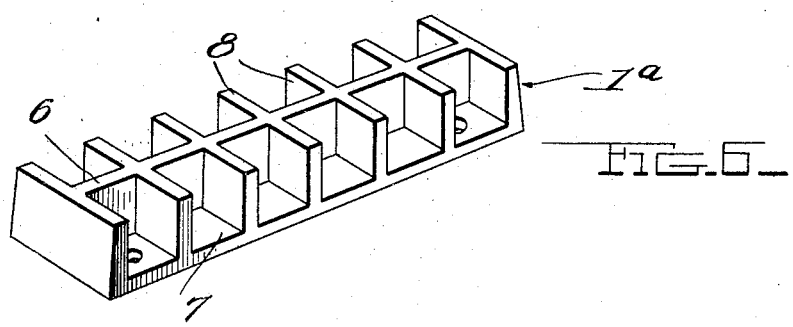
Figs. 6 and 7 are perpective views of the castings employed.
Figure 7:
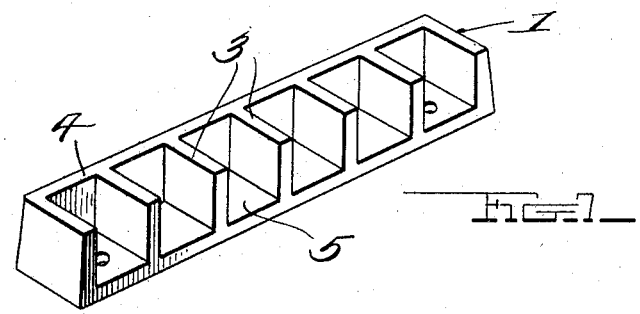

In specifically describing the structure shown in the drawings above briefly described, similar characters will be employed to designate corresponding parts throughout the several views and reference will be herein made to the numerous elements by their respective indices. To this end, the numerals 1 and 1ª designate castings in which the ends of bars 2 are held, it being from these bars that portions of the floors of different kinds of stalls are to be constructed.

Each casting 1 is in the form of a horizontal bar L-shape in transverse section and having a plurality of vertical webs 3 extending between its upright and horizontal flanges 4 and 5 respectively, all of said webs being spaced apart equi-distantly and disposed in parallel relation.

Each casting 1ª is in the form of a bar which is inverted T-shape in cross section, the vertical flange 6 of said bar rising from the longitudinal center of its base flange 7. Opposed vertical transverse webs 8 extend between the web 6 and base 7 and are spaced apart distances equal to the spaces between the webs 3.

In constructing a plurality of cow stalls the required number of sills 9 will be laid in the pit 10, which pit is disposed in rear of the solid portion 11 of the floor and extending from approximately the middle of the stall to beyond the rear and having the top of its rear wall located below the level of the floor (see Figs. 1 to 3) or, as shown in the drawings, said sills may be constructed integrally with the walls and bottom of the pit and with the floor if these parts be formed of concrete or the like. Castings 1ª will be secured by expansion bolts or the like 12 passing through the bases thereof, on the upper sides of each of the sills 9 with their upper sides disposed flush with the portion 11 of the floor, and the endmost stalls will be provided at the outer edges thereof with the castings 1 which will be supported upon sleepers or the like 9ª (see Fig. 3). The bars 2 will now be laid as depicted in Fig. 1 with their ends received in the sockets prevailing between the webs of the numerous castings. If the cow to occupy the stall is of good size, the bars 2 will be extended between all of the sockets of adjacent castings, but if a small animal is to occupy the same, certain of the rearmost bars will be omitted as will be clear from Fig. 1.

To prevent a large cow from stepping sidewise into the pit in rear of the bars 2 of a stall to contain a smaller cow, posts 13 will preferably be provided and if desired, partitions may be employed. The mangers 14 will be disposed a suitable distance in advance of the openwork part of the floor and any suitable means such as stanchions may be employed in connection therewith.

In constructing horse stalls as shown in Figs. 4 and 5, the bars 2 will run longitudinally of said stalls and no castings 1ª will be employed, castings 1, however, being provided for securing the front and rear ends of the bars 2 in position above a pit 10ª which will extend beneath all of the stalls. If employing the invention for this purpose, partitions 13ª will be preferably provided between adjacent stalls, said partitions extending rearwardly suitable distances from the mangers 14ª to prevent the stock from maltreating each other.

By constructing either cow or horse stalls in the manner shown and described, it will be evident that all moisture may drain therefrom into the pit and may be removed from the latter in any suitable way, thus keeping the stall dry and clean. In cow stalls, the droppings will fall into the pit in rear of the bars 2 and may be readily cleaned therefrom and from time to time the bars themselves may be detached, cleansed and again placed in position. However, owing to the top of the rear wall of the pit being lower than the floor, cleansing implements may be inserted into the pit under the bars without removing them.

I claim:

A stable floor for a plurality of parallel stalls comprising a pit extending transversely of the stalls from the middle of said stalls and beyond the rear end thereof, a series of rectangular sills in said pit extending longitudinally from the middle of the stalls to a point spaced from the rear of the pit to form the rear end of the stalls said sills having from their tops located below the surface of said floor, castings on and attached to said sills, each of said castings being of inverted T-shape in cross section and having a horizontal rectangular base flange and a vertical flange extending longitudinally at the middle thereof and flush with the floor surface, a plurality of transverse ribs extending between said flanges and in alinement on opposite sides of said vertical flange, said ribs being spaced equal distances apart to form pockets adapted to receive a plurality of bars therein whereby to form an open-work continuation of the floor of said stall said bars being detachably and interchangeably disposed in the pockets whereby the length of the stall floor may be varied from the rear and access to the pit easily obtained, the rear wall of said pit being lower than the surface of the floor whereby to permit of the insertion of cleansing implements underneath said bars without removing the same.

In testimony whereof I have hereunto set my hand in the presence of two subscribing witnesses.

JAMES A. ST. JOHN.

Witnesses:
JOSEPH SMITH,
MARY E. MOLEY.

Copies of this patent may be obtained for five cents each, by addressing the "Commissioner of Patents, Washington, D. C."